(No Model.) 2 Sheets—Sheet 2.
O. MARTH.
ROTARY PLOW.
No. 469,046. Patented Feb. 16, 1892.
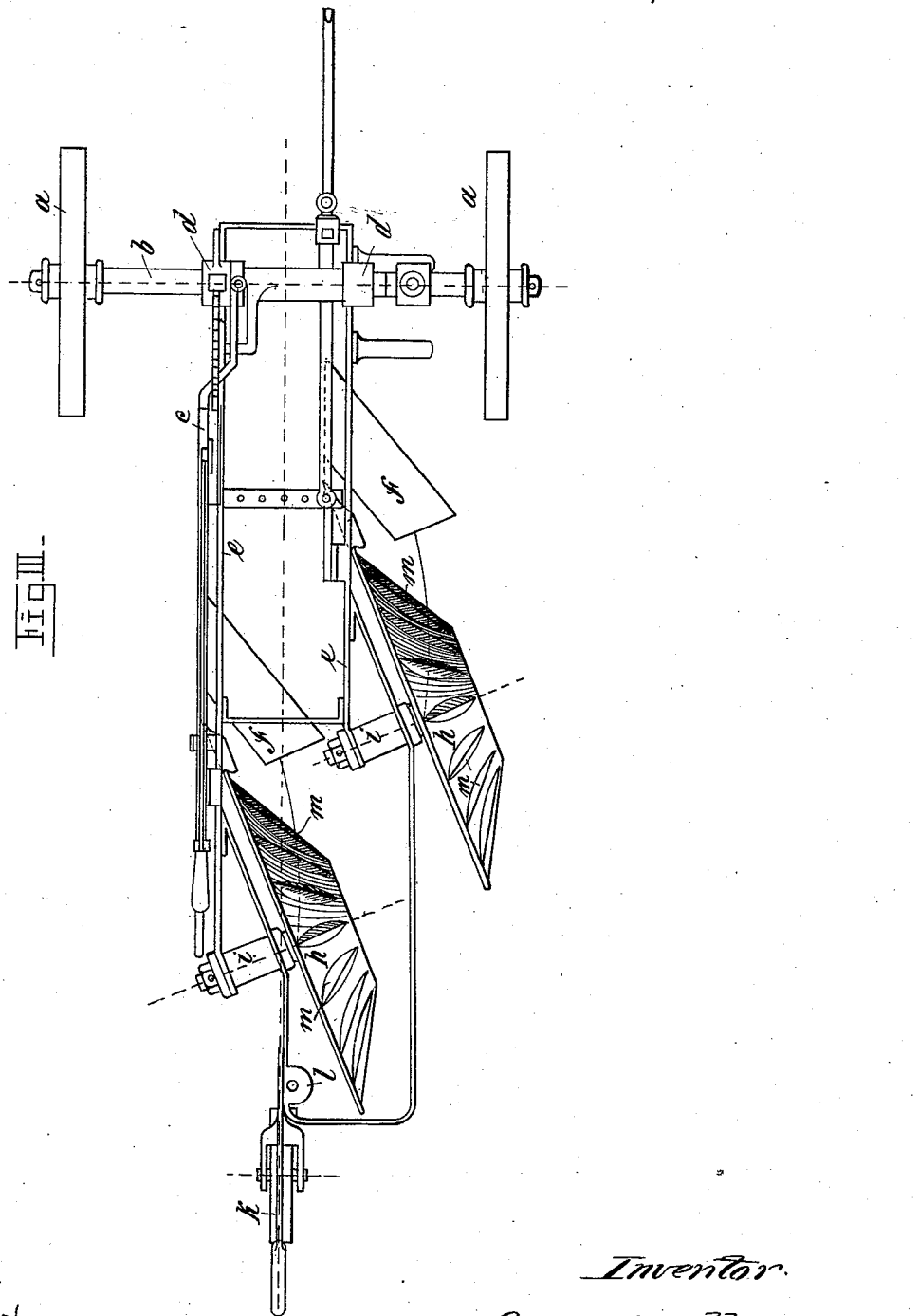
Witnesses.
A. M. Best
Fred'k H. Mills.
Inventor.
Oscar Marth.
By Coburn & Thacher
Att'ys

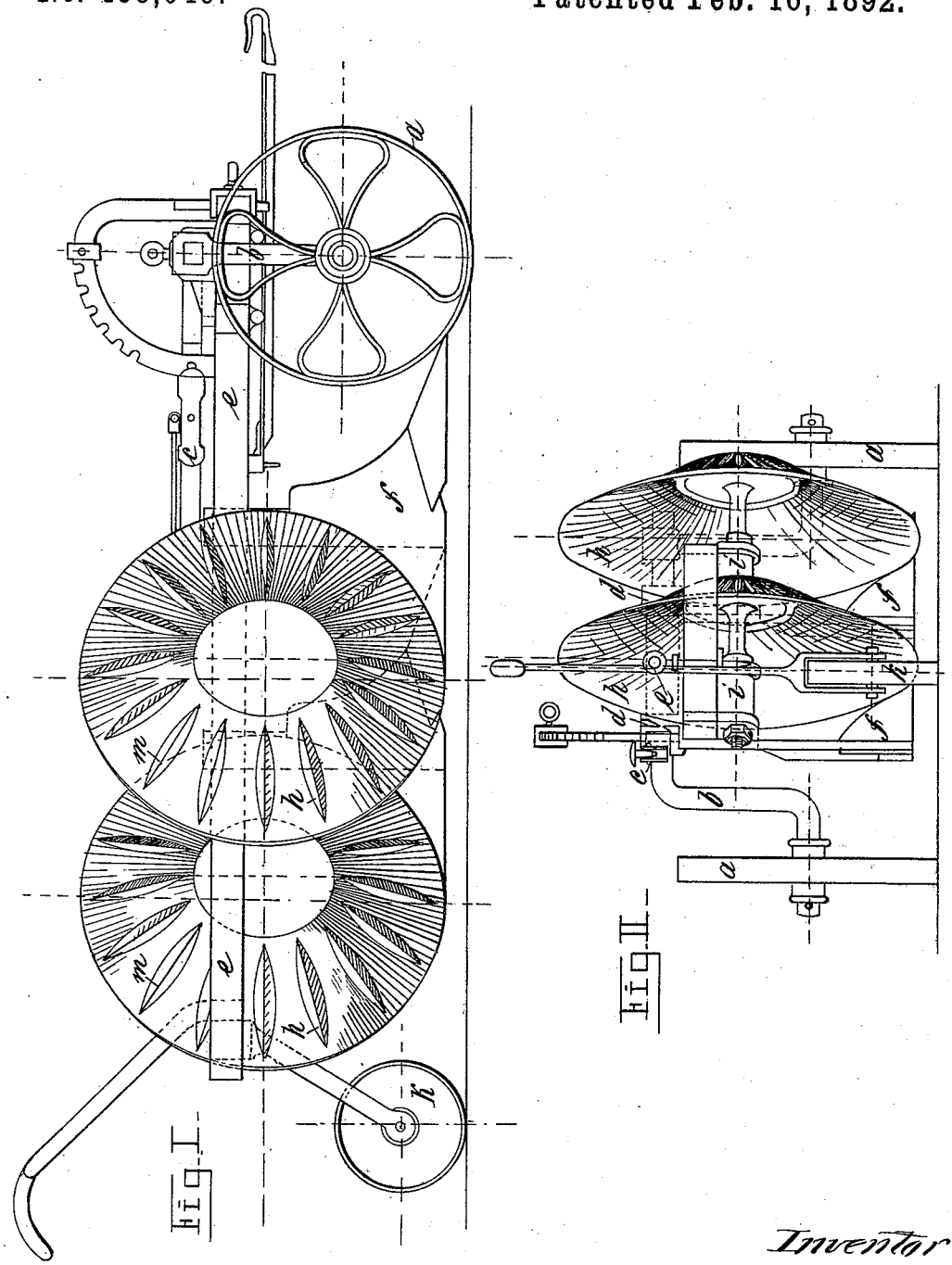

UNITED STATES PATENT OFFICE.

OSCAR MARTH, OF BERLIN, GERMANY.

ROTARY PLOW.

SPECIFICATION forming part of Letters Patent No. 469,046, dated February 16, 1892.

Application filed September 29, 1891. Serial No. 407,112. (No model.)

*To all whom it may concern:*

Be it known that I, OSCAR MARTH, director, of Berlin, in the Kingdom of Prussia, German Empire, have invented a new and useful Rotating Plow, of which the following is a specification, reference being had therein to the accompanying drawings.

This invention relates to a plow saving considerable power and effecting the even distribution or deposition of the soil which has been plowed up, for which purposes the plow is provided with adjustable dished plates or shovels behind the shares of the plow, so as to take up the soil fed by the shares and to turn and disintegrate the same, afterward placing it in the open furrows.

In the accompanying drawings I illustrate a plow constructed according to my invention.

Figure I is a side elevation. Fig. II is a rear view, and Fig. III is a plan view of the same.

In this case my invention has been applied to a plow having two shares; but it may also be used for plows having one or any number of shares. The plow, as shown, consists of a frame $e$, having an axle $b$, on which is situated an adjustable pair of wheels $a$, a roller $k$ with pin $l$, and a lever $c$ for adjusting the pair of wheels $a$. Besides the foregoing parts the frame $e$ is provided with the shares $f$. The pair of wheels $a$ are adjusted by the lever $c$ so that the wrought-iron frame $e$ and the shares $f$ are lowered according to the depth to which the soil is to be worked. The frame $e$ is further provided with the sleeves $i$, situated obliquely to the frame and forming the bearings for the pivots of dished plates or disintegrating-wheels $h$. One of these dished plates is provided behind each share. These dished plates $h$ are provided with ribs $m$, by means of which they are rotated through making contact with the ground when the plow is propelled. At the same time these ribs serve to disintegrate the soil fed from the shares. If desired, shovels may be used instead of the dished plates. When the roller $k$ (used for transporting the plow) has been taken off after removing the pin $l$ and the shares have been adjusted to the desired height, the plow is propelled forward. The shares $f$ cut the soil at right angles and push it toward the dished plates $h$, where the soil is disintegrated, turned over, and thrown sidewise into the open furrow.

By the above-described arrangement of the rotary dished plates $h$ little power is required to place the soil into the open furrow in the most suitable manner, as the soil is thus fed systematically by the rotation of the dished plates $h$, the force exerted having only to overcome the slight friction between the sleeves $i$ and the pivots of the plates $h$. These plows may be adapted to any soil or ground, and though they may be used very advantageously for plowing the soil at less or greater depth the advantages are particularly apparent in the latter case.

What I claim, and desire to secure by Letters Patent of the United States, is—

A rotary plow characterized by the arrangement behind the share or shares of one or more adjustable dished plates with ribs or shovels which take up the soil, turn over and disintegrate the same, and place it sidewise in the open furrows for the purposes of saving power and effecting an even distribution of soil thrown up, substantially as described.

In witness whereof I have hereunto set my hand in presence of two witnesses.

OSCAR MARTH.

Witnesses:
 PAUL FISCHER,
 FRIEDR. HOLUNG.